Oct. 29, 1957  R. P. ALEX  2,811,324
TURBO-JET DRIVEN HELICOPTER
Filed Oct. 27, 1953                                   2 Sheets-Sheet 1
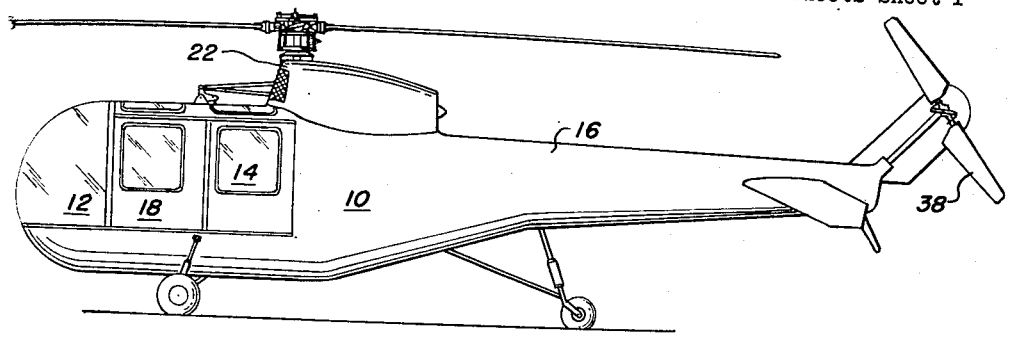
Fig. 1
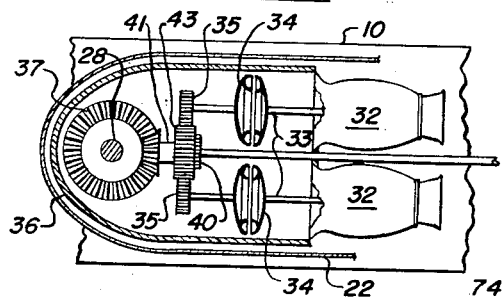
Fig. 5
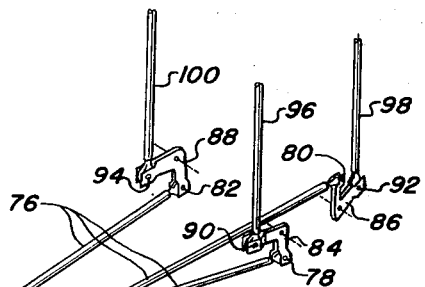
Fig. 2
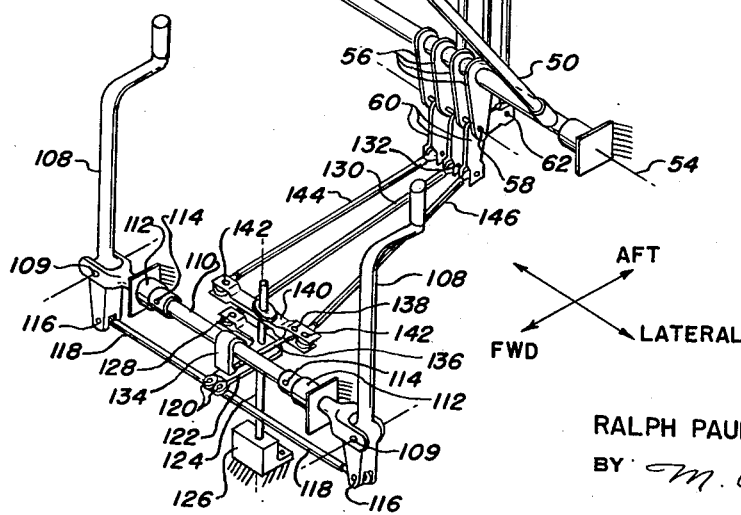
INVENTOR
RALPH PAUL ALEX
BY
ATTORNEY Oct. 29, 1957  R. P. ALEX  2,811,324
TURBO-JET DRIVEN HELICOPTER
Filed Oct. 27, 1953  2 Sheets-Sheet 2

INVENTOR
RALPH PAUL ALEX
BY *M. B. Tasker*
ATTORNEY

United States Patent Office 2,811,324
Patented Oct. 29, 1957

2,811,324

TURBO-JET DRIVEN HELICOPTER

Ralph P. Alex, Fairfield, Conn., assignor to United Aircraft Corporation, East Hartford, Conn., a corporation of Delaware Application October 27, 1953, Serial No. 388,508

1 Claim. (Cl. 244—17.21)

This invention relates to rotary wing aircraft, particularly helicopters, and has as one of its objects an improved construction for such aircraft in which a gas turbine engine is mounted externally of the fuselage aft of the main rotor drive pylon.

Another object of the invention is to provide an improved arrangement of the main and auxiliary rotor drives for such an aircraft.

A further object of the invention is to provide a small, compact helicopter having an unusually large cabin space for a ship of its size.

A still further object of the invention is generally to improve the construction and operation of rotary wing aircraft.

These and other objects and advantages of the invention will be apparent from the following detailed description of a preferred embodiment of the invention shown in the accompanying drawings.

In these drawings:

Fig. 1 is a side elevation of a helicopter embodying the invention;

Fig. 2 is a perspective view showing the pilots' control mechanism for the main rotor;

Fig. 5 is an enlarged detail showing an arrangement of two turbine motors in another embodiment of the invention.

Figures 3, 4:
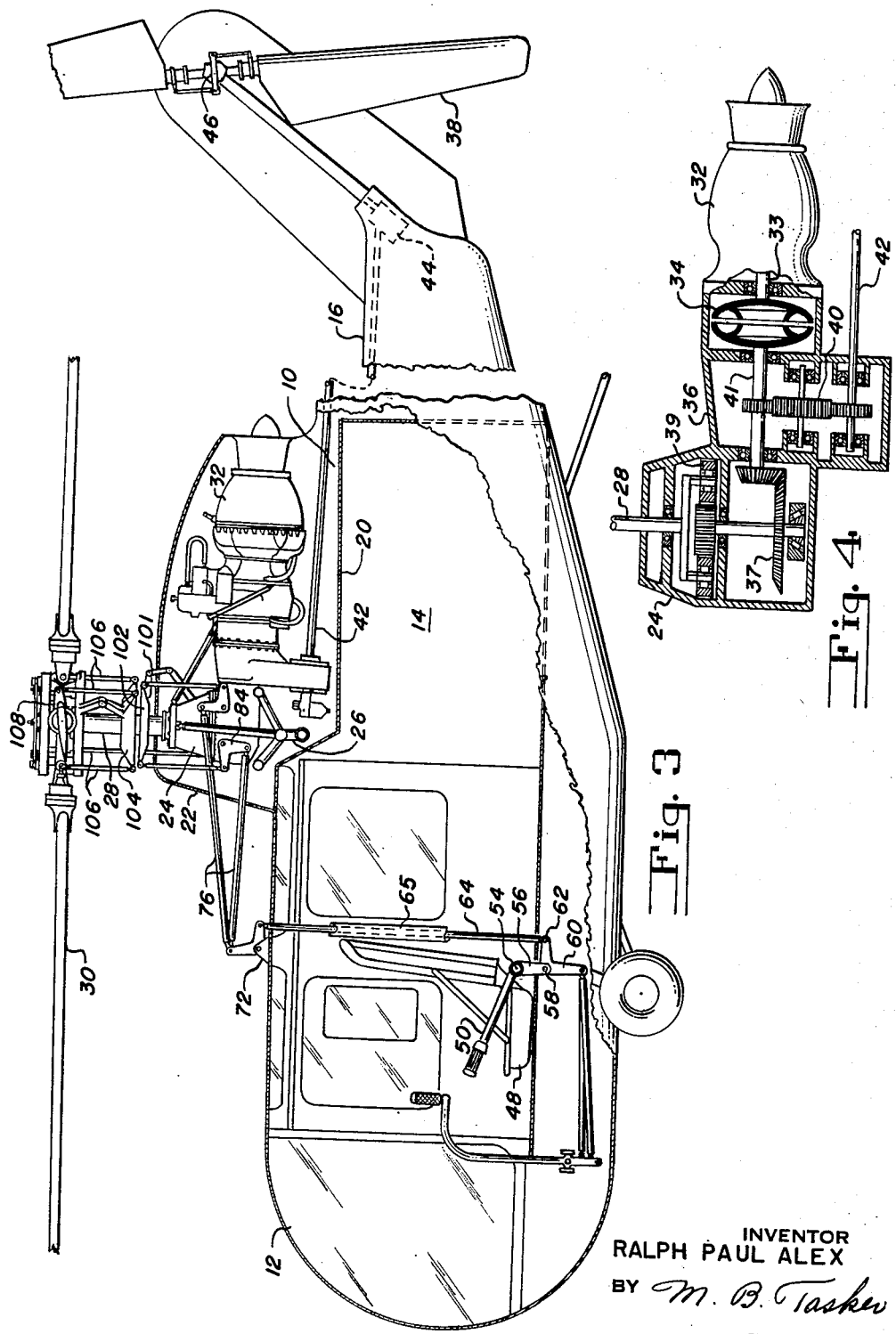
Fig. 3 is a side view on an enlarged scale, partly in section.
Fig. 4 is an enlarged detail showing the driving connections between the turbine and the main rotor gear box.

As herein shown, the improved helicopter of this invention includes a fuselage 10 having forward pilot compartment 12, a central cargo or passenger compartment 14 and a tail cone 16. The passenger compartment is provided with a forward door 18 on one side of the ship and it will be noted from Fig. 3 that the passenger compartment 14 is full door height at its forward portion but has a somewhat lower roof 20 over its aft portion where the passengers are seated, the seats being omitted in the drawings for clarity. The construction is such that more doors could be added and the capacity of the passenger compartment increased by lengthening the fuselage.

A main rotor pylon 22 houses the main rotor gear box 24 which is supported from the fuselage by suitable supports one of which is shown at 26. The main rotor head is supported on the upper end of an upright drive shaft 28 which extends upwardly from the gear box 24 and has the main rotor blades 30 pivotally mounted thereon for blade pitch changing movement in a usual manner. Herein four such blades 30 are shown although the number may be more or less as desired.

In accordance with this invention, pylon 22 is elongated in an aft direction to extend over the lower portion 20 of the cabin roof for the purpose of housing a gas turbine engine 32 and the driving connections from this turbine to the drive shaft 28. This driving connection includes a fluid clutch 34 in housing 36 located aft of the gear box 24 which connects the turbine drive shaft 33 to bevel reduction gearing 37 and planetary reduction gearing 39 contained in the gear box 24 and hence to the shaft 28 extended into the gear box. The fluid clutch contains a lock-up mechanism (not shown), such as described in Patent No. 2,644,535, issued July 7, 1953.

The usual anti-torque tail rotor 38 is mounted for rotation about a generally horizontal axis at the aft end of the tail cone 16. In accordance with this invention the drive for the tail rotor 38 is taken off from the drive shaft 41 beneath the latter through gearing 40 which drives a tail rotor drive shaft 42 extended aft through the pylon 22 beneath the turbine and through the tail cone 16 to an angle gear box 44 and thence to the tail rotor drive shaft 46. The pitch of the tail rotor is varied in the usual manner to vary the directional heading of the aircraft through suitable cables connected to pilots' rudder pedals (not shown). A modification of the invention is shown in Figure 5 where two turbines are arranged in such a way that either or both may drive the rotors. The turbines 32 are located on top of the cabin roof 20 so that their drive shafts 33 are parallel. Fluid couplings 34 driven by shafts 33 and containing free wheeling and lock-up mechanisms are provided to permit alternate or simultaneous engagement of the turbines. The output shafts of the fluid couplings carry gears 35 both of which mesh with gear 43 carried by drive shaft 41. Drive shaft 41 caries a bevel gear at its other end which drives bevel ring gear 37 and hence drives upright rotor drive shaft 28. Gear 43 also drives gear 40 which is carried by and drives the tail rotor drive shaft 42. Of course, other gearing arrangements may be more desirable depending on the operating characteristics of the gas turbine engines. The additional power provided by the dual engines will permit a much larger weight to be carried by the helicopter. To this end, the fuselage may be extended fore and aft of the center of gravity to obtain greater cubic area for seating additional passengers. This arrangement would have two engine dependability without sacrificing the compactness of a small ship or necessitating an engine location which would in any way interfere with the free loading of passengers or cargo.

In the pilots' compartment, two side-by-side seats 48 are provided, one of which is shown in Fig. 3 and convenient to these seats are the usual dual controls for the main rotor pitch. These controls which are shown most clearly in Fig. 2, include the collective pitch sticks 50 connected by a shaft 52 and rotatable about an axis 54. The shaft 52 has fixed thereto, four depending arms 56 which are pivoted at 58 to the midpoint of three bellcranks 60 so that as the collective pitch sticks 50 are moved toward a vertical position, the bellcranks 60 are raised and moved forward bodily in unison about their pivots with the rods 130, 144 and 146. The generally horizontal arms of the bellcranks 60 are pivoted at 62 to the lower ends of three generally vertical rods 64 which extend upwardly behind the pilots' seats and through the cabin roof where they are pivotally connected respectively at 66 to the horizontal arms of three bellcranks 68 pivoted at 70 in a bracket 72 mounted on the cabin roof. The rods 64 are grouped together and enclosed in a hollow casing 65 providing for a minimum reduction in visibility. The vertical arms of the bellcranks 68 are pivotally connected at 74 to three rods 76 respectively which extend aft over the cabin roof and into the pylon 22. The aft ends of rods 76 are pivotally connected at 78, 80 and 82 to one arm of bellcranks 84, 86 and 88 respectively, which are suitably pivoted on fixed structure in the pylon. The other ends of bellcranks 84, 86 and 88 are pivoted at 90, 92 and 94 to three vertical rods 96, 98 and 100 which are connected to the non-rotating portion 102 of the swash plate. Of these rods, the rod 98 is connected to the port rear portion of the plate 102, rod 96 is connected at the port forward side and the rod 100 is connected at the starboard forward portion of this plate, thus effecting a uniform vertical movement of the plate to vary the pitch of all of the blades in unison as the total pitch sticks are moved. The rotating portion 104 of the swash plate has four rods 106 extending up to the blade horns 108 of the several rotor blades 30.

To provide for the cyclic pitch control of the blades, two pilots' sticks 108 are provided which are pivotally connected on pivots 109 intermediate their ends to opposite ends of a transverse rod 110 journalled at 112 in fixed structure of the aircraft and held in these journals against axial movement by collars 114 fixed to rod 110. The lower ends of sticks 108 are connected by universal joints 116 to mutually inwardly directed links 118 which are separately pivotally connected at pivot points 120 to the forward end of a bellcrank 122, the midpoint of which is journalled on a fixed vertical shaft 124. The shaft 124 is mounted in fixed structure of the aircraft at its upper and lower ends, one of these fixed mounts being shown at 126 in Fig. 2. Bellcrank 122 has a laterally extending arm pivotally connected at 128 to a rod 130 which extends aft and is connected to the depending arm of the middle bellcrank 60 at 132. Since this bellcrank 60 is operatively connected through rods 64 and 76 to bellcrank 84 which is connected with the front port side of the stationary swash plate 102 by rod 96, it will be evident that any lateral movement of the sticks 108 about their pivots 109 will result in raising and lowering the swash plate 102 at one side, thus providing for lateral control of the ship. The diagonally opposite point of the swash plate is connected to the fuselage by a scissors 101 to prevent rotation of the swash plate portion 102.

The shaft 110 has rigidly secured thereto a depending arm 134, the lower end of which is pivotally connected to the forward end of thrust link 136 the aft end of which is pivoted at 138 to a walking beam 140 centrally pivotally mounted on the rod 124. The opposite ends of the walking beam 140 are pivotally connected at 142 to aft extending rods 144 and 146 respectively which are connected to the depending arms of the two outside bellcranks 60. Since these bellcranks are connected through rods 64 and 76 to rods 100 and 98 which are connected to the starboard forward and port aft points on the nonrotating swash plate 102, it will be evident that fore and aft movements of the sticks 108 will result in a substantially fore and aft tilting of the swash plate to provide pitching control of the ship.

It will be noted that during fore and aft movements of the sticks 108 about the axis of shaft 110, no movement of bellcrank 122 will take place due to the universal connections of the rods 118 to the lower ends of these sticks at 116 and the separate connections of the rods 118 to the bellcrank 122 by the vertical pivots 120.

It will be evident that as a result of this invention a particularly compact arrangement of the engine and its driving connections to the main rotor has been provided. By the location of the engine and its associated driving mechanism above the cabin, it has been possible to provide a small and compact helicopter which will accommodate six or seven passengers besides the two pilots which formerly could carry only two passengers and the pilots.

It will further be evident that a particularly advantageous arrangement of the pilots' controls for the main rotor has been provided by which the control linkage occupies very little space in the cabin. Also a particularly advantageous arrangement of the tail rotor drive connections to the gear box has been provided.

While only one embodiment of the invention has been illustrated, it will be evident that various changes in the arrangements of the parts may be resorted to without departure from the scope of the invention.

I claim:

In a helicopter, a fuselage, a sustaining rotor above said fuselage having variable pitch blades, a torque counteracting tail rotor adjacent one end of said fuselage, a gear box mounted on said fuselage, a rotor drive shaft extending from said gear box and supporting said rotor, a gas turbine prime mover mounted on said gear box aft of said rotor shaft having its jet discharge directed rearwardly and its power shaft directed forwardly toward said rotor shaft, a partial torque fluid clutch including a direct drive lockup between said power shaft and said gear box, a drive shaft for said tail rotor extending aft from said gear box, said gear box comprising reduction gearing between said turbine power shaft and said tail rotor shaft and between said power shaft and said sustaining rotor shaft.

References Cited in the file of this patent

UNITED STATES PATENTS

| 2,503,172 | Pullin | Apr. 4, 1950 |
| 2,599,690 | Buivid | June 10, 1952 |

FOREIGN PATENTS

| 625,176 | Great Britain | June 23, 1949 |

OTHER REFERENCES

Jane's "All the World's Aircraft" 1952–1953, McGraw-Hill, New York, Sept. 30, 1952, page 243.